Aug. 15, 1967   Z. RÁDL   3,335,460
PRESS FOR EXTRUDING MASSES IN THE PLASTIC STATE
Filed Nov. 1, 1965   3 Sheets-Sheet 1
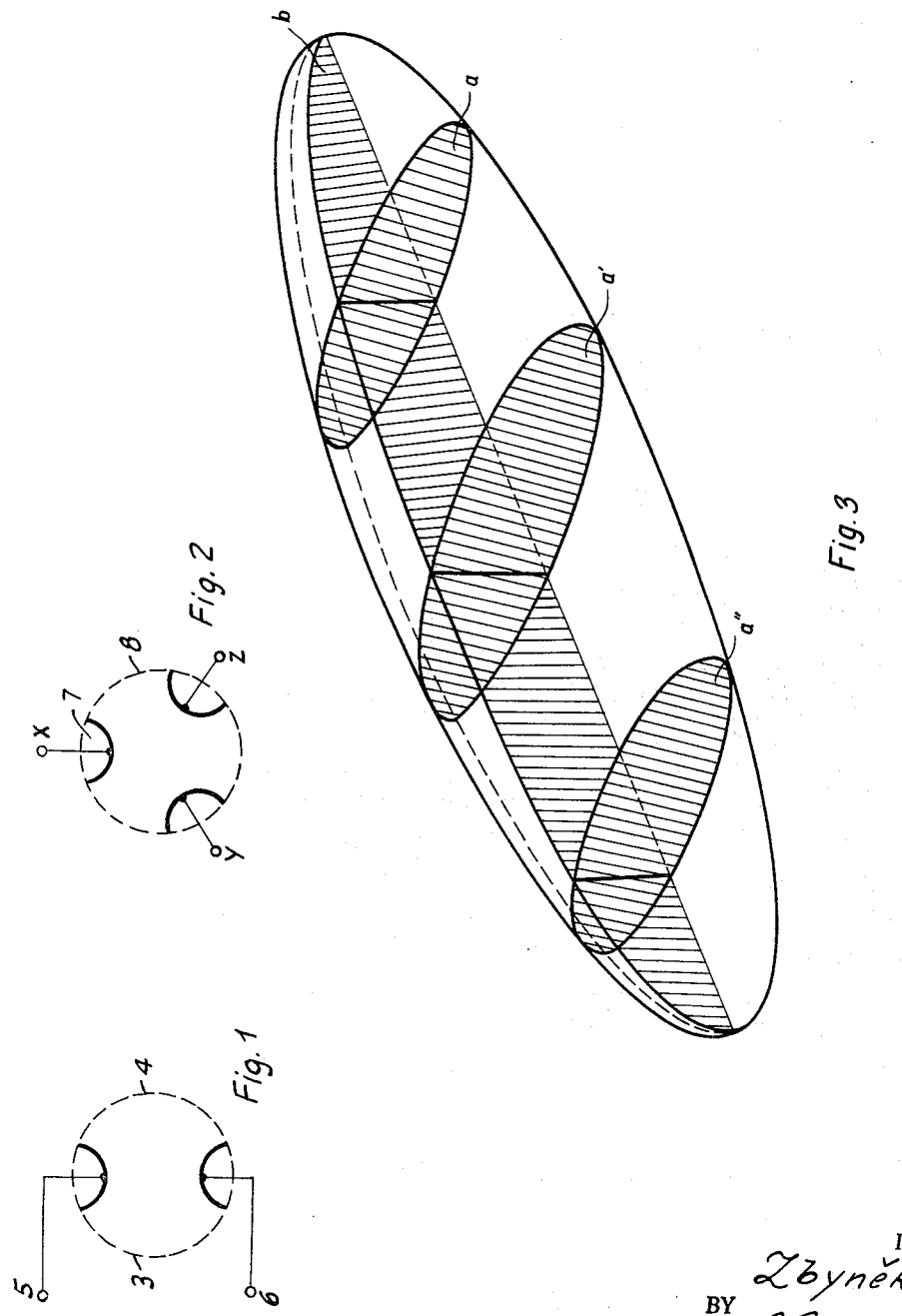
INVENTOR.
Zbyněk Rádl
BY Aug. 15, 1967  Z. RÁDL  3,335,460
PRESS FOR EXTRUDING MASSES IN THE PLASTIC STATE
Filed Nov. 1, 1965  3 Sheets-Sheet 3

INVENTOR.
Zbyněk Rádl
BY

United States Patent Office
3,335,460
Patented Aug. 15, 1967

3,335,460
PRESS FOR EXTRUDING MASSES IN THE
PLASTIC STATE
Zbynek Radl, Hradec Kralove, Czechoslovakia, assignor to Tesla, narodni podnik, Prague, Czechoslovakia
Filed Nov. 1, 1965, Ser. No. 505,883
Claims priority, application Czechoslovakia,
Nov. 10, 1964, PV 6,225/64
5 Claims. (Cl. 18—12)

ABSTRACT OF THE DISCLOSURE

Electrodes for resistance heating of a plastically deformable green ceramic mixture during extrusion from a press are arranged symmetrically about the axis of a heating chamber. The exposed conductive face of each electrode defines a smooth convex curve in all sections perpendicular or parallel to the chamber axis. The location of these curves is defined with reference to equipotential surfaces in a hypothetical electric field between hypothetical conductive surfaces which are of circular cross section about the axis of the heating chamber through the circumferences of the symmetrically arranged portions of the heating chamber wall covered by the electrodes.

This invention relates to extrusion presses for shaping green ceramic masses by extrusion, and particularly to the resistance heating of such masses by an electric current passing therethrough.

It has been proposed heretofore electrically to heat green ceramic masses while they are being extruded from a press in order to hasten their drying and to enhance their plasticity.

The known devices are not capable of uniformly heating the extruded mass if the current supplying electrodes are circumferentially arranged about a solid body of ceramic material more than about 100 millimeters in diameter or about a hollow body of correspondingly greater diameter. The current density has been found to be lowest in the portion of the extrudate which moves fastest, usually in the center, so that heating is least effective there.

It is the primary object of this invention to overcome the shortcomings of the known resistance heating devices.

More specifically, it is an object of this invention to arrange the heating chamber in an extrusion press of the type described in such a manner that the extruded material is heated practically uniformly in the electric field.

In one of its aspects, the invention resides in an improvement in the known extrusion press whose heating chamber is equipped with at least two electrodes and a source of electric potential connected to the electrodes for passing an electric current through the material in the chamber, the chamber having an axis, being open in both axial directions for passage therethrough of the material being extruded, and having an axial wall which is symmetrical about the axis. The electrodes cover face portions of the wall which are located symmetrically relative to the axis.

The improvement resides mainly in the location and configuration of the electrodes. The circumference of each afore-mentioned face portion of the heating chamber and the chamber axis define a surface whose cross sections transverse of the axis are circular arcs about the axis of not more than 120°. If these surfaces were conductive and connected to the afore-mentioned source of potential, they would define an electric field in an electrically homogeneous mass in the heating chamber, the potential of the field varying from 0 percent of the applied source potential contiguously adjacent one of the conductive surfaces to 100 percent of the applied potential contiguously adjacent the other surface, and a series of equipotential surfaces in the chamber intermediate the conductive surfaces.

The actual electrodes each have an exposed, conductive face which projects from the axial chamber wall toward the axis. Each section of the electrode face perpendicular to the axis is a smooth curve located between the two equipotential surfaces of the hypothetical field corresponding to potential values of 10 and 40 percent respectively. The sections of the electrode face taken in the direction of the axis are smooth curves located between the equipotential surfaces of the hypothetical field corresponding to potential values of 5 and 40 percent respectively of the applied potential. The conductive face of each electrode is elongated substantially in the direction of the chamber axis, the length being 1.5 to 10 times the greatest dimension of the face in the afore-mentioned perpendicular sections.

The above definition of the electrode faces unequivocally limits their location in the heating chamber. They are preferably segments of ellipsoids, but may deviate from an ellipsoidal shape.

It will be appreciated that the actual electric field generated between the exposed electrode faces is different from the afore-described hypothetical field.

The electrodes are made either from conducting or semi-conducting material, or they are provided with at least an exposed face layer of conducting or semi-conducting material, and are separated by insulating material.

The longitudinal ends of each electrode face are preferably tapered.

The longitudinal axes of the electrode faces are either parallel to the axis of the heating chamber and the direction of movement of the ceramic material through the chamber, or they define an acute angle of not more than 30° with the chamber axis. The longitudinal axis of the electrode faces may also be a helix inclined relative to the heating chamber axis at an angle not greater than 30°.

The exact nature of this invention will be best understood from the following description of preferred embodiments when considered in conjunction with the attached drawing in which:

FIG. 1 diagrammatically illustrates the disposition of two electrodes of the invention in a heating chamber, the view being at right angles to the chamber axis;

FIG. 2 shows a heating chamber with three electrodes in a view corresponding to that of FIG. 1;

FIG. 3 diagrammatically illustrates the elongated shape of an electrode of the invention in a perspective view;

Figure 4:
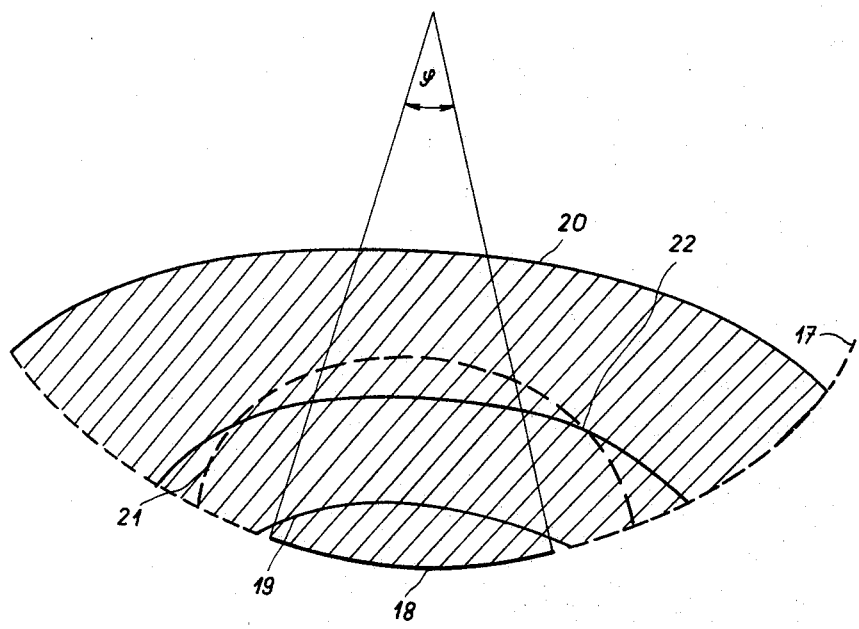
FIG. 4 shows the face of the electrode of FIG. 3 and related shapes in transverse section.

Referring now to the drawing in detail, and initially to FIG. 1, there is seen the heating chamber of an extrusion press which is of circular cross section and provided with two radially projecting electrodes 1, 2 of the invention which are arranged diametrically opposite each other, and separated from each other by portions 3, 4 of the axial chamber wall which consist of insulating material. The electrodes 1, 2 are connected to the terminals 5, 6 of a source of single-phase alternating current, not otherwise shown.

FIG. 2 shows a similar heating chamber, an axial wall 8 and three projecting electrodes 7 which cover respective face portions of the wall 8.

The three electrodes 7 are connected to the terminals X, Y, Z of a source of three-phase alternating current.

FIG. 4 shows one of the electrodes illustrated in FIGS. 1 and 2. The exposed face of the electrodes consists of metal, and the electrode may either be of metallic material or of insulating material faced with conductive metal. The leads shown in FIGS. 1 and 2 have been omitted from FIG. 3. The transverse sections $a$, $a'$, $a''$ of the elongated electrode shown in FIG. 3, and all other transverse sections of the exposed electrode face, which faces the viewer in FIG. 3, are bounded by segments of an ellipse. Similarly, the longitudinal section $b$ and all other longitudinal sections of the exposed electrode face are segments of ellipses.

FIG. 4 illustrates necessary dimensional relationships between the electrode of FIG. 3 and the heating chamber in a section perpendicular to the chamber axis.

The circumference of the wall face portion covered by the electrode and the axis of the heating chamber define a surface about the axis whose section is a circle 17 in the view of FIG. 4. If a portion 18 of this surface which extends over an arc $\varphi$ of less than 120° were conductive and connected to one pole of the source of potential, and if another conductive surface similarly defined by a second electrode were connected to another pole of the source, the two hypothetical conductive surfaces would define an electric field in an electrically homogeneous mass filling the heating chamber. This hypothetical mass is partly indicated by hatching in FIG. 4. The equipotential surfaces in this field at which the potential has a value of 10% and 40% respectively of the applied source potential are represented in the sectional view of FIG. 4 by curves 19 and 20. The actual electrode face coincides with the curve 22 which represents the equipotential surface at 20% of the applied potential.

Figure 5:
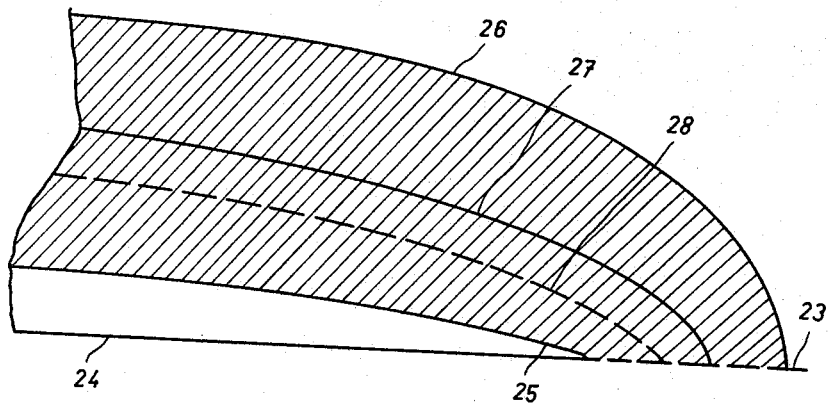
FIG. 5 shows the device of FIG. 4 in fragmentary section on its longitudinal axis.

FIG. 5 shows the corresponding relationships in an axial section. The surface defined by the chamber axis and the circumference of the covered portion of the axial wall is represented by a straight line 23, and the hypothetical conductive surface which causes the hypothetical potential is shown at 24. The equipotential surfaces at 5% and 40% of the applied potential value are indicated by the curves 25 and 26 respectively, and the actual exposed electrode surface is arranged between these equipotential surfaces and represented by the curve 27.

The curves 21 in FIG. 4 and 28 in FIG. 5 shown in broken lines illustrate a modified electrode face of the invention which is not a segment of an ellipsoid and does not coincide with an equipotential surface.

When the exposed electrode face coincides in longitudinal and transverse section with an equipotential surface in the hypothetical field, the material extruded from the press is heated very uniformly over its cross section. If the requirements for uniform heating are not very stringent, the contours of the electrode face may deviate from the shape illustrated in FIG. 3, and may assume a somewhat different shape, as illustrated by the curves 21, 28, which may be prepared more readily than the preferred ellipsoid shape.

Figure 6:
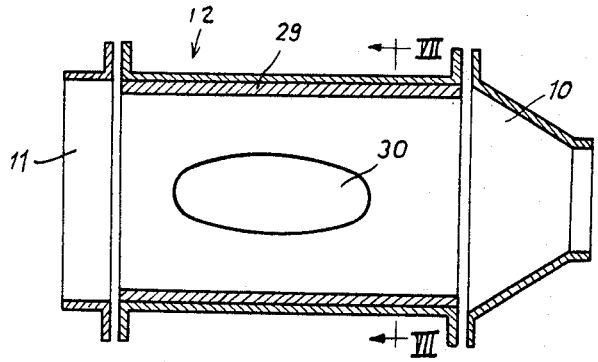
FIG. 6 shows a portion of an extrusion press equipped with the electrode of FIG. 3 in axial section.
Figure 7:
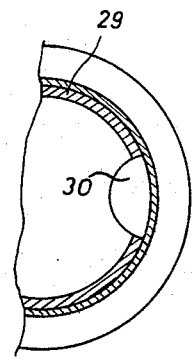
FIG. 7 shows the press of FIG. 6 in fragmentary radial section on the line VII—VII.

FIGS. 6 and 7 show as much of an extrusion press for green ceramic masses, as is needed for an understanding of this invention, only a cylindrical heating chamber 9, a nozzle 10, and the end 11 of an extrusion barrel being shown, these parts normally being flanged to each other. The inner wall of the chamber 9 is covered with a layer 29 of insulating material between its two projecting electrodes 30 of which only one is seen in the drawing, the electrodes being of the type shown in FIG. 3.

Figure 8:
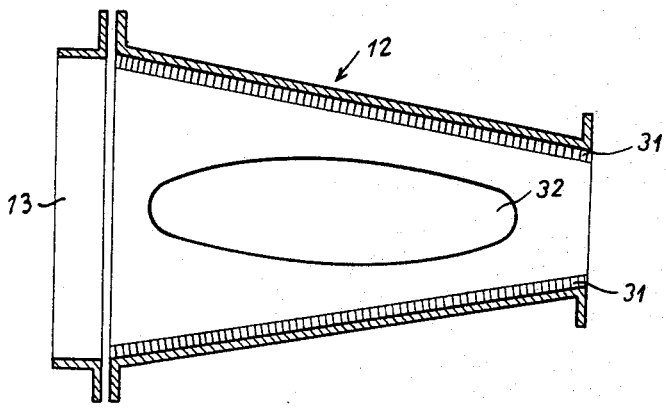
FIG. 8 shows a modified extrusion press in a view corresponding to that of FIG. 6.
Figures 9, 10:
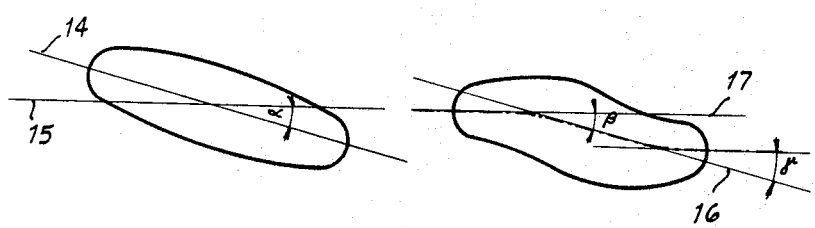
FIGS. 9 and 10 respectively illustrate modified electrode arrangements in a conventional manner.

The embodiment of the invention shown in FIG. 8 is provided with a frustoconical heating chamber 12 attached to an extruder barrel 13. An insulating liner 31 separates the projecting electrodes 32.

The electrodes shown in FIGS. 6 and 7 have longitudinal axes which are straight and parallel to the axis of the heating chamber 9. The single electrode seen in FIG. 8 has a longitudinal axis which slopes toward the axis of the heating chamber 12. FIG. 17 shows yet another arrangement in which the longitudinal axis 14 of the electrode is straight and defines a small angle $\alpha$ with the heating chamber axis 15, the angle being smaller than 30°. In the further modified embodiment illustrated in FIG. 18, the longitudinal axis 16 of the electrode is a section of a helix which defines with the heating chamber axis 17 acute angles smaller than 30° which vary in magnitude between the values $\beta$ and $\gamma$ shown in the drawing.

Heating chambers equipped with electrodes in the manner of the invention are particularly advantageous for extruding profiles of relatively large cross section such as rod insulators, but may be used for extruding profiles of any shape, including hollow extrudates.

What I claim is:

1. In an extrusion press having a heating chamber, at least two electrodes in the chamber, a source of electric potential connected to said electrodes for passing an electric current through material in the chamber, the chamber having an axis, being open in both axial directions for passage therethrough of the material being extruded, and having an axial wall symmetrical about said axis, said electrodes covering respective face portions of said wall located symmetrically relative to said axis, the improvement in the electrodes which comprises:

(a) the circumference of each of said face portions and said axis defining a surface, each cross section of said surface transverse of said axis being a circular arc about said axis not greater than 120°;

(b) said surfaces if conductive and connected to said source defining an electric field in an electrically homogeneous mass in said heating chamber, the potential of said field varying from 0 percent of the applied potential of said source contiguously adjacent one of said conductive surfaces to 100 percent of said applied potential contiguously adjacent the other conductive surfaces, and a series of equipotential surfaces in said chamber intermediate said conductive surfaces;

(c) each electrode having an exposed conductive face projecting from said wall toward said axis,
      (1) each section of said face perpendicular to said axis being a smooth curve located between two of said equipotential surfaces corresponding to 10 percent and 40 percent respectively of said applied potential,
      (2) each section of said face in the direction of said axis being a smooth curve located between two of said equipotential surfaces corresponding to 5 percent and 40 percent respectively of said applied potential,
      (3) the length of said face substantially in said direction being 1.5 to 10 times the greatest dimension of said face in said perpendicular sections.

2. In a press as set forth in claim 1, said smooth curves being convex toward said axis.

3. In a press as set forth in claim 1, the exposed face of each electrode having substantially the shape of a segment of an ellipsoid.

4. In a press as set forth in claim 1, said exposed face of each electrode having a longitudinal axis defining with said axis of the heating chamber an angle not greater than 30°.

5. In a press as set forth in claim 4, said longitudinal axis being helically curved about said axis of the heating chamber.

References Cited

UNITED STATES PATENTS

| | | | |
|---|---|---|---|
| 2,398,318 | 4/1946 | MacMillin et al. | 264—26 |
| 2,436,999 | 3/1948 | MacMillin et al. | |
| 2,448,676 | 9/1948 | MacMillin et al. | 264—26 |
| 2,849,312 | 8/1958 | Peterman | 264—108 XR |
| 3,268,633 | 8/1966 | Jansen | 264—27 |

FOREIGN PATENTS 884,061  7/1953  Germany.

WILLIAM J. STEPHENSON, *Primary Examiner.*